US006044552A

United States Patent [19]

Mori et al.

[11] Patent Number: 6,044,552

[45] Date of Patent: Apr. 4, 2000

[54] TAPPET MADE OF LIGHT METAL AND A METHOD OF MANUFACTURING THE SAME

[75] Inventors: Akiyoshi Mori, Yokohamashi; Tatsuo Kanzaki, Fujisawa, both of Japan

[73] Assignee: Fuji Oozx Inc., Kanagawa-ken, Japan

[21] Appl. No.: 09/181,365

[22] Filed: Oct. 28, 1998

[30] Foreign Application Priority Data

Oct. 29, 1997 [JP] Japan .................................... 9-297494

[51] Int. Cl.[7] ................................ B23K 11/02; F01L 1/14

[52] U.S. Cl. ..................................... 29/888.43; 123/90.51

[58] Field of Search .............................. 123/90.51, 90.48; 29/888.03, 888.43; 74/569

[56] References Cited

U.S. PATENT DOCUMENTS 5,184,583 2/1993 Grell .................................... 123/90.51
5,662,076 9/1997 Ohtsubo et al. ..................... 123/90.51

FOREIGN PATENT DOCUMENTS 0 581 406 A1 3/1993 European Pat. Off. .......... F01L 1/14
42 37 361 A1 5/1994 Germany .

OTHER PUBLICATIONS

Database WPI Week 902027 Jun. 1990; Derwent Publications Ltd., London, GB; AN m23; XP002090452; object preparation for relief contact welding—by making ring–shaped reliefs on welded object surface (Elec Appts Cons Res); Aug. 7, 1989 *abstract*.

*Primary Examiner*—Andrew M. Dolinar
*Attorney, Agent, or Firm*—Oppenheimer Wolff & Donnelly LLP

[57] ABSTRACT

A tappet made of light metal comprises a ceiled cylindrical tappet body made of light metal, and a cam receiving plate made of hard metal which has the same outer diameter as that of the tappet body, and which is provided at its outer peripheral edge with a sharp annular piece, the cam receiving plate being integrally coupled to the tappet body by causing the annular piece to bite into the top surface and welding the annular piece and the top surface. With this structure, the tappet body and the cam receiving plate made of different materials can be bonded strongly.

4 Claims, 4 Drawing Sheets

TAPPET MADE OF LIGHT METAL AND A METHOD OF MANUFACTURING THE SAME

BACKGROUND OF THE INVENTION

1. Field of the Invention

The present invention relates to a tappet made of light metal such as aluminum alloy having a hard cam receiving plate secured to a top surface of the tappet, and also relates to a method of manufacturing the tappet.

2. Description of the Prior Art

Recently, a tappet used for a direct-acting type valve operating mechanism of an internal combustion engine tends to be made of aluminum alloy for reducing inertial mass of a valve operating system.

In such a tappet made of aluminum alloy, a shim made of hard metal having abrasion resistance is fitted to a recess formed on a top surface of the tappet for preventing abrasion of the top surface on which a cam slides.

However, if such a shim is used, management of the parts is troublesome, and not only the assembling line of the engine is complicated, but also effective surface area of a sliding portion of the top surface of the tappet with the cam is reduced. Therefore, if a lift amount of an engine valve is to be increased, it is necessary to increase an outer diameter of a tappet body, and to mount a cam having a large diameter.

If doing so, a cylinder head is also enlarged, and a flexibility in engine design is limited.

To solve such a problem, there is proposed a tappet in which a cam receiving plate made of hard metal is integrally secured to the entire top surface of a tappet body made of aluminum alloy.

The above-described cam receiving plate is secured on the top surface of the tappet body by electric resistance welding, brazing or the like. However, in order to couple different materials having largely different melting points, it is necessary to strictly manage the heating temperatures of both the material, such operation is troublesome, and coupling strength is prone to be deviated.

Further, aluminum alloy has a great activity, and metal oxide is prone to be formed on a surface thereof. Therefore, if both the materials are simply abutted against each other, there is a problem that impurity such as the metal oxide is mixed into the joint boundary, and a sufficient coupling strength can not be obtained.

SUMMARY OF THE INVENTION

In view of the above disadvantages, it is an object of the invention to provide a tappet made of light metal in which a tappet body and a cam receiving plate made of different material are easily be secured to each other with a great coupling strength, and to provide a producing method of the tappet.

The above problem is solved by a tappet made of light metal of the present invention comprising a ceiled cylindrical tappet body made of light metal, and a cam receiving plate made of hard metal which has the same outer diameter as that of the tappet body, and which is provided at its outer peripheral edge with a sharp annular piece, the cam receiving plate being integrally coupled to the tappet body by causing the annular piece to bite into the top surface and welding the annular piece and the top surface.

According to the tappet of the invention, since a newly generated surface having no metal oxide is formed on the contact surface between the tappet body and the annular piece, it is possible to strongly bond the cam receiving plate to the tappet body having different materials by welding such a portion using appropriate heating means.

Further, the above problem is solved by the method of manufacturing a tappet made of light metal, comprising the steps of: holding a ceiled cylindrical tappet body made of light metal whose top surface is subjected to insulation treatment, and a cam receiving plate made of hard metal which is provided at its outer peripheral edge with an annular piece having a sharp blade tip end such that the top surface of the tappet body and the annular piece of the cam receiving plate face each other by a pair of electrodes of an electric resistance welding apparatus; then relatively moving one of the pair of electrodes toward the other electrode until mating surfaces of the tappet body and the cam receiving plate are tightly contacted with each other, thereby shearing an outer peripheral end of a top wall of the tappet body by the blade tip end of the annular piece; and electrically heating a contact portion between the sheared surface and the annular piece by both the electrodes, thereby bonding the cam receiving plate to a top portion of the tappet body.

According to the method of the invention, since a forming operation of the newly generated surface by shearing the top wall, and the conductive heating of the contact portion between the sheared surface and the annular piece are continuously carried out, the bonding operation of the cam receiving plate can be conducted easily and efficiently.

BRIEF DESCRIPTION OF THE DRAWINGS

The features and advantages of the present invention will become more apparent from the following description with respect embodiments as shown in the appended drawings wherein.

DETAILED DESCRIPTION OF THE INVENTION

Figure 1:
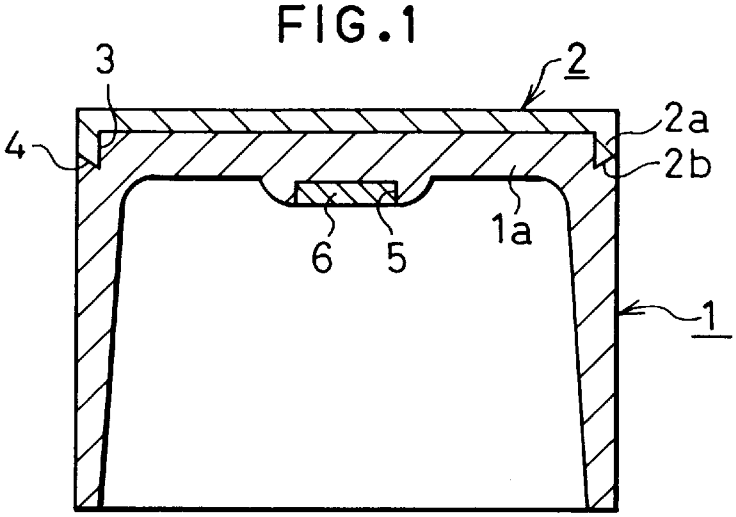
FIG. 1 is a front vertical central sectional view showing one embodiment of a tappet of the present invention.

FIG. 1 shows one embodiment of a tappet of the invention. A cylindrical tappet body 1 has an upper surface closed with a top wall 1*a*, and is made of aluminum alloy (Al—Si based aluminum alloy, for example). A cam receiving plate 2 made of hard metal (chromium molybdenum steel, for example) having the same outer diameter as that of the tappet body 1, and integrally formed at its outer peripheral end with a downward annular piece 2*a* is integrally welded to an upper portion of the top wall 1 a such that a sharp blade 2*b* formed on a tip end of the annular piece 2*a* bites into an upper end outer peripheral edge of the top wall 1*a*.

The tappet body 1 is previously subjected to T6 treatment under JIS (Japanese Industrial Standards), the treatment comprising tempering after hardening.

A portion of the cam receiving plate 2 bonded to the tappet body 1 is only a portion of the cam receiving plate excluding an abutted surface thereof against the top wall 1*a*, i.e., only an inner peripheral surface 3 and a lower end surface 4 of the annular piece 2a.

A hard chip 6 against which a shaft end of an engine valve (not shown) is mounted in an upward recess 5 formed in a central portion of a lower surface of the top wall 1a. The outer peripheral surface of the tappet body 1 is subjected to a surface treating using abrasion resistance metal.

Next, a manner of bonding the cam receiving plate 2 to the tappet 1 body will be explained.

Figure 2:
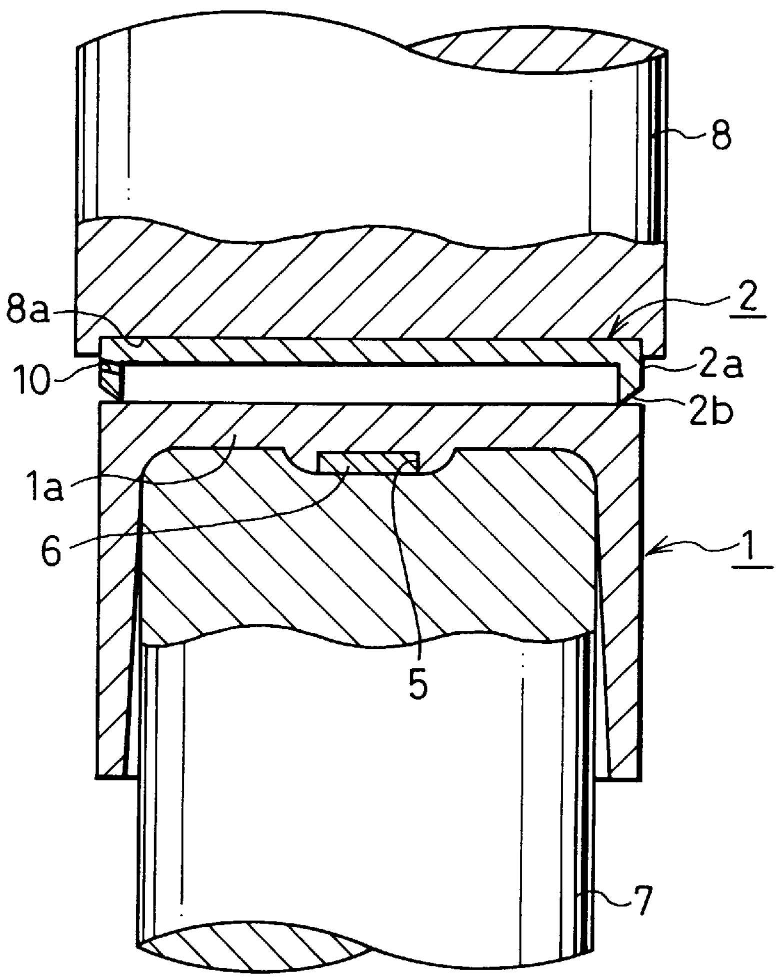
FIG. 2 is a front vertical central sectional view showing a state before shearing in a method of the invention.

As shown in FIG. 2, first, the tappet body 1 made of aluminum alloy to which a chip 6 is previously mounted is fitted over an immovable lower electrode 7 of an electric resistance welding apparatus (projection welding apparatus) from above such that an upper end surface of the lower electrode 7 and a lower surface of the tappet body 1 are tightly contacted with each other. The entire upper surface of the top wall 1a is formed with non-conductive insulation film.

Next, the cam receiving plate 2 is fitted and held in a groove 8a of a lower surface of a vertically movable upper electrode 8 which is coaxially with the lower electrode 7, and the tip end of the blade 2b of the annular piece 2a abuts against the upper surface of the top wall 1a for standing by.

Figure 3:
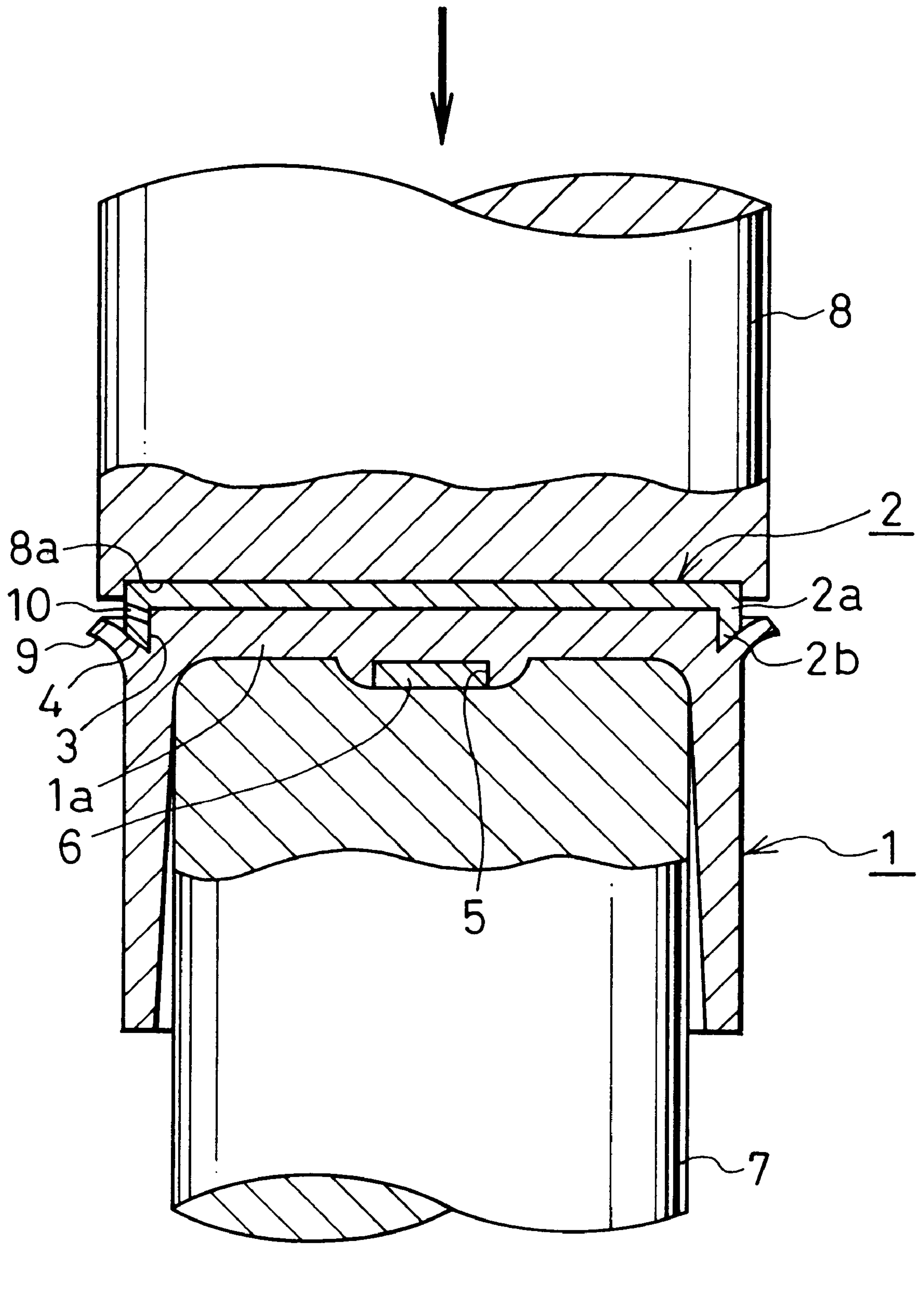
FIG. 3 is a front vertical central sectional view showing a state after shearing and at the time of electrical conduction.

Then, as shown in FIG. 3, the upper electrode 8 is lowered so that the cam receiving plate 2 abuts against the upper surface of the top wall 1a. As a result, the upper end outer peripheral portion of the top wall 1a is sheared by the blade 2b of the annular piece 2a of the cam receiving plate 2, and the sheared piece is projected outward as a burr.

With this operation, the sheared surface of the tappet body 1, i.e., a contact surface between an inner surface and a lower end of the annular piece 2a becomes a newly generated surface having no metal oxide.

In this state, if electricity is conducted between both the upper and lower electrodes 7 and 8, electric current flows through the contact portion with the annular piece 2a on which the insulation film is not formed, and such portion is locally heated by resistance so that the inner surface 3 and the lower end 4 of the annular piece 2a are bonded to the upper end outer peripheral portion of the top wall 1a and the cam receiving plate 2 is integrally secured to the tappet body 1.

The sheared piece 9 may be removed by the final finishing machinery work.

When the cam receiving plate 2 is pressed, in order to prevent air in a space surrounded by the lower surface and the top wall 1a thereof from being compressed, and to prevent adherence property between the lower surface of the cam receiving plate 2 and the upper surface of the top wall 1a from being deteriorated, it is preferable to provide the vent hole 10 in a portion of the cam receiving plate 2.

Such a vent hole 10 may be provided in the tappet body 1 in place.

If the cam receiving plate 2 is bonded in the above-described manner, since a complete newly generated surface is formed on the bonded surface of the tappet body 1 bonded to the annular piece 2a, there is no possibility that impurity such as metal oxide is mixed in the joint boundary, and they are bonded extremely strongly.

Figure 4:
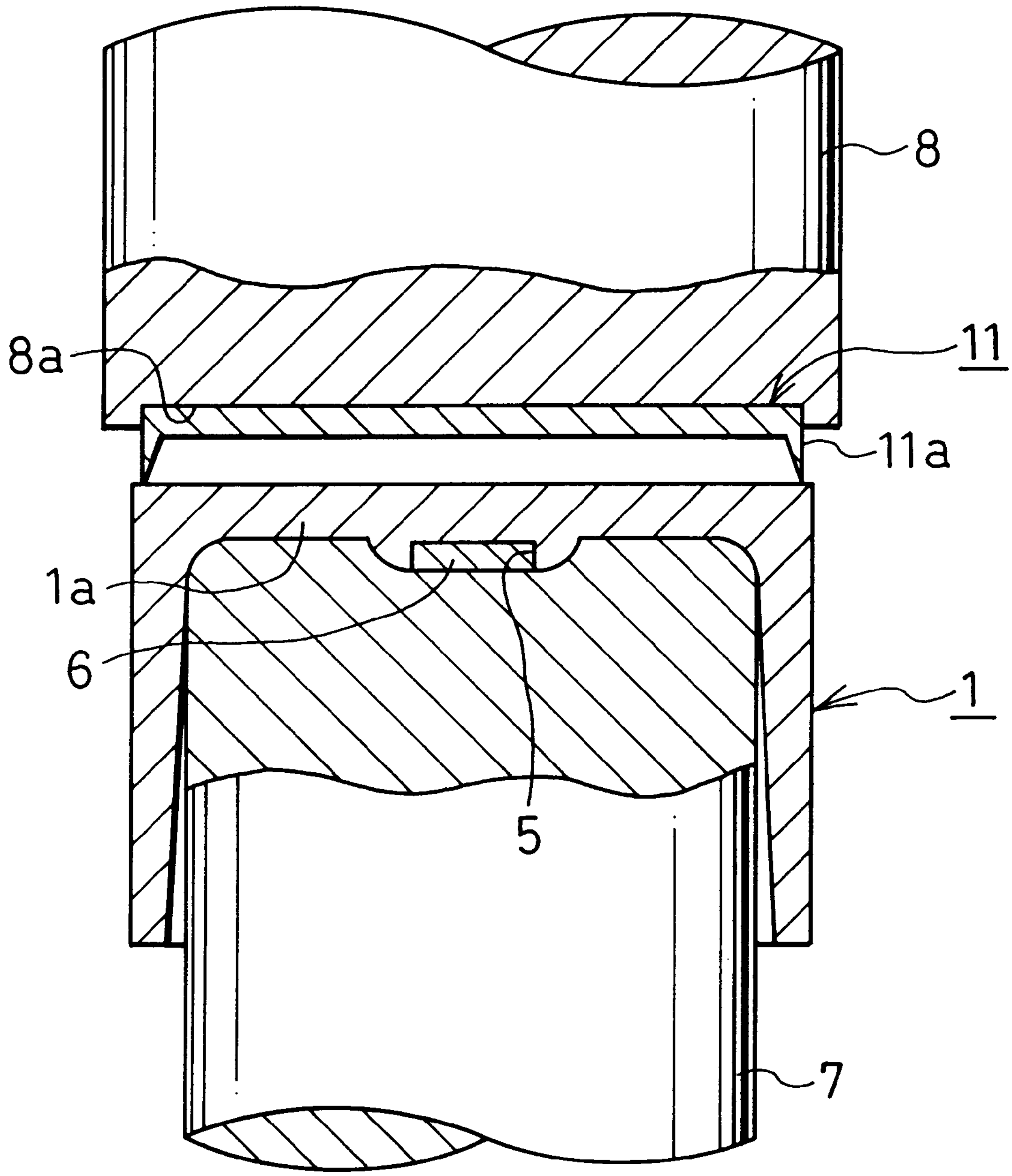
FIG. 4 is a front vertical central sectional view showing a state before shearing when a cam receiving plate having a different shape is used.
Figure 5:
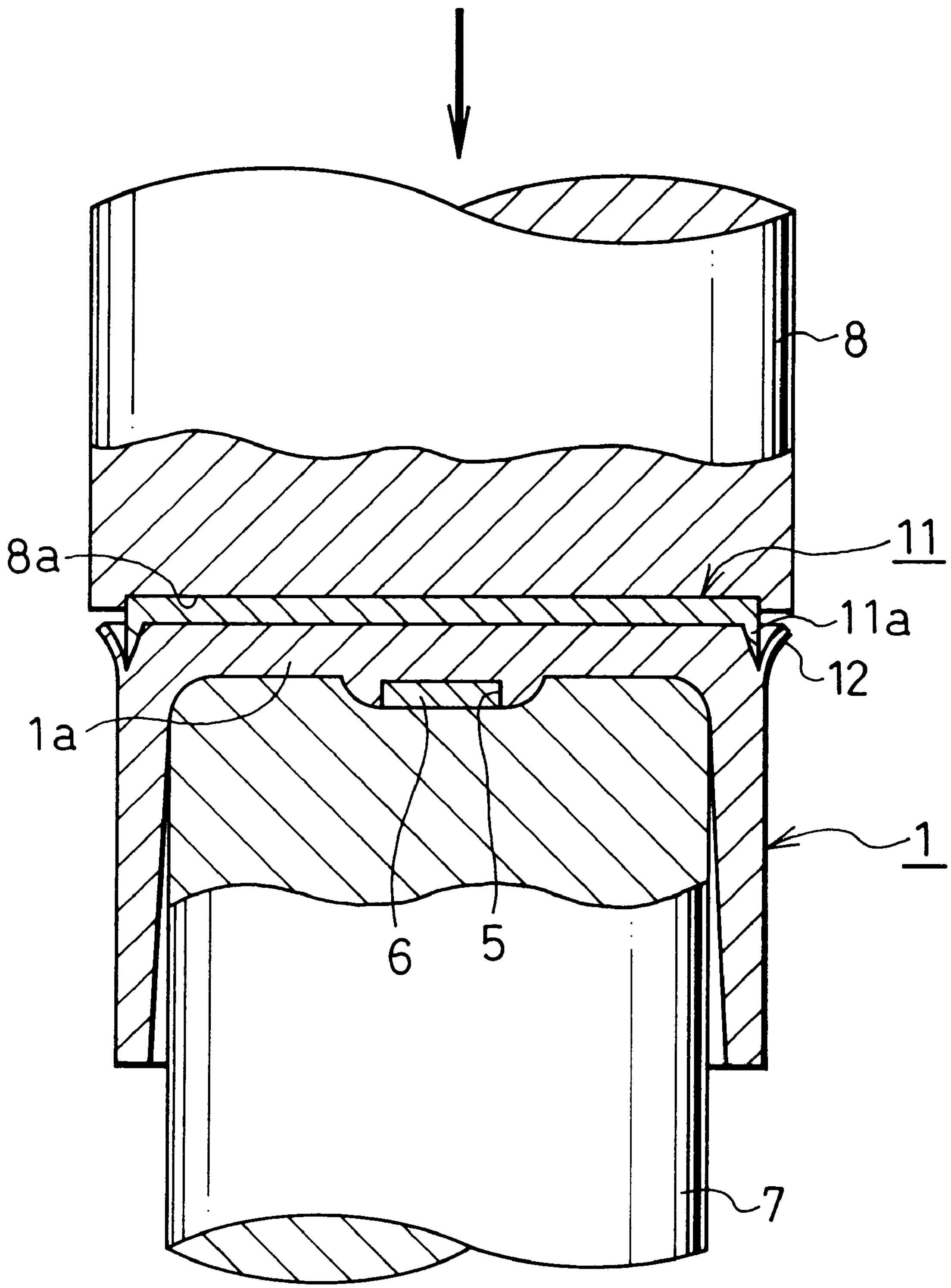
FIG. 5 is a front vertical central sectional view showing a state after shearing and at the time of electrical conduction.

FIGS. 4 and 5 show a manner to bond a cam receiving plate 11 having a shape different from that of the previous example.

The cam receiving plate 11 used in this embodiment has an outer diameter which is slightly smaller than that of the tappet body 1, and an annular piece 11a is downwardly projected from an outer peripheral end of the cam receiving plate 11. A diameter of an inner peripheral surface of the annular piece 11a is gradually increased toward a tip end thereof to form a tapered surface, thereby forming a sharp blade.

To bond the cam receiving plate 11 to the upper surface of the top wall 1a of the tappet 1, the insulation film is formed on the upper surface of the top wall 1a as in the previous embodiment and then, the cam receiving plate 11 is fitted in the recess groove 8a of the upper electrode 8, and a lower end of the cam receiving plate 11 is abutted against the upper surface of the top wall 1a as shown in FIG. 4.

Then, as shown in FIG. 5, if the upper electrode 8 is lowered, the upper end outer periphery of the top wall 1a is sheared by the sharp annular piece 11a, and a sheared piece 12 in the form of a burr is produced. At that time, the upper end of the top wall 1a is plastically deformed inwardly by the tapered surface of the inner surface of the annular piece 11a.

Then, if electricity is conducted between both the upper and lower electrodes 7 and 8, electric current flows through the contact portion with the annular piece 11a, and such portion is locally heated by resistance so that the inner surface of the annular piece 11a is bonded to the upper end outer peripheral portion of the top wall 1a and the cam receiving plate 11 is integrally secured to the tappet body 1.

The sheared piece 12 is removed when the outer diameter of the tapped body 1 is subjected to a finishing working to reduce the outer diameter of the tappet body down to the outer diameter of the cam receiving plate 11.

In this embodiment, since a complete newly generated surface is formed on the bonded surface of the tappet body 1 bonded to the annular piece 11a, there is no possibility that impurity such as metal oxide is mixed in the joint boundary, and they are bonded extremely strongly.

Although it is not illustrated in the drawings, a vent hole is provided in the tappet body 1 or the cam receiving plate 11 so as to prevent air in a space below the cam receiving plate 11 from being captured in this embodiment.

Although the upper surface of the top wall 1a is sheared by the cam receiving plate 2 or 11 and then, both the electrodes 7 and 8 are electrically conducted in any of the above-described bonding manners, the electrodes 7 and 8 may be electrically conducted simultaneously with the start of pressing by the upper electrode 8, i.e., simultaneously with the start of shearing.

It is preferable to control the supply electric current at that time such as to gradually increase in proportion to the progress of the shearing so as to prevent the tappet body 1 from being excessively melted at the initial stage of the shearing.

If the electrodes 7 and 8 are electrically conducted simultaneously with the start of the shearing in this manner, since a portion of the tappet 1 to be sheared is softened, it is possible to easily shear with a small pressing force.

It goes without saying that the present invention can be also applied to a tappet 1 in which tappet body is made of magnesium alloy.

The foregoing relate to preferred embodiment of the present invention. Various modifications and changes may be made by person skilled in the art without departing from the scope of claims wherein:

What is claimed is:

1. A method of manufacturing a tappet made of light metal, comprising the steps of: holding a ceiled cylindrical tappet body made of light metal whose top surface is subjected to insulation treatment, and a cam receiving plate made of hard metal which is provided at its outer peripheral edge with an annular piece having a sharp blade tip end such that said top surface of said tappet body and said annular piece of said cam receiving plate face each other by a pair of electrodes of an electric resistance welding apparatus; then relatively moving one of said pair of electrodes toward the other electrode until mating surfaces of said tappet body and said cam receiving plate are tightly contacted with each other, thereby shearing an outer peripheral end of a top wall of said tappet body by said blade tip end of said annular piece; and electrically heating a contact portion between the sheared surface and said annular piece by both said electrodes, thereby bonding said cam receiving plate to a top portion of said tappet body.

2. The method according to claim 1 wherein when shearing of said top wall by said blade tip end of said annular piece is started, electricity is conducted simultaneously.

3. The method according to claim 2 wherein electric current conducted is gradually increased with progress of said shearing.

4. The method according to claim 1 wherein a vent hole is provided in place of said top wall of said tappet body or said cam receiving plate for discharging out air kept between said top surface of said cam receiving plate.

* * * * *